United States Patent
Gallagher et al.

(10) Patent No.: US 10,132,124 B2
(45) Date of Patent: Nov. 20, 2018

(54) ANTI-ROTATION DEVICE FOR PIPE STRING

(71) Applicant: OIL STATES INDUSTRIES (UK) LTD., Aberdeen (GB)

(72) Inventors: John Gallagher, Aberdeen (GB); Martin James Ward, Aberdeen (GB)

(73) Assignee: OIL STATES INDUSTRIES (UK) LTD., Aberdeen (GB)

( * ) Notice: Subject to any disclaimer, the term of this patent is extended or adjusted under 35 U.S.C. 154(b) by 270 days.

(21) Appl. No.: 14/888,030

(22) PCT Filed: Mar. 13, 2014

(86) PCT No.: PCT/GB2014/050745
§ 371 (c)(1),
(2) Date: Oct. 29, 2015

(87) PCT Pub. No.: WO2014/177832
PCT Pub. Date: Nov. 6, 2014

(65) Prior Publication Data
US 2016/0076316 A1    Mar. 17, 2016

(30) Foreign Application Priority Data

May 1, 2013 (GB) .................................. 1307910.8

(51) Int. Cl.
*E21B 17/043* (2006.01)
*E21B 19/16* (2006.01)
*F16L 15/08* (2006.01)

(52) U.S. Cl.
CPC ............ *E21B 17/043* (2013.01); *E21B 19/16* (2013.01); *F16L 15/08* (2013.01)

(58) Field of Classification Search
CPC ...... E21B 17/043; E21B 19/16; E21B 17/085; F16L 15/007; F16L 15/08
See application file for complete search history.

(56) References Cited

U.S. PATENT DOCUMENTS 620,821 A    3/1899  Abbey
643,358 A *  2/1900  Konold ................. F16L 37/252
                                                217/107
(Continued)

FOREIGN PATENT DOCUMENTS

GB    2218169    11/1989
GB    2479818    6/2014
(Continued)

OTHER PUBLICATIONS

PCT—International Search Report and Written Opinion; PCT/GB2014/050745; dated Mar. 13, 2015.
(Continued)

*Primary Examiner* — Daniel P Stephenson
(74) *Attorney, Agent, or Firm* — Morgan, Lewis & Bockius LLP

(57) ABSTRACT

Disclosed is a tubular pipe string element having a pin connector and a box connector complementary to the pin connector. The pin and box connectors are rotationally engageable with the respective box and pin connectors of another pipe string element and have complementary anti-rotation devices that cooperate to prevent unintentional relative rotation between the connectors. The anti-rotation devices may include saw-tooth profiled, radially extending teeth and a steep trailing tooth flank angle for the pin member, and at least one detent member formed on the pipe string element for the box connector. When securing the pin and box connectors, the leading flanks of the teeth engage with the detent members while allowing the connectors to rotate into a fully connected position. The steep trailing tooth flank is trapped by the detent member when in the fully connected position to prevent unintentional release of the connection.

20 Claims, 7 Drawing Sheets

(56) References Cited

U.S. PATENT DOCUMENTS

| | | | |
|---|---|---|---|
| 1,534,916 A | | 4/1925 | Campbell |
| 1,717,186 A | | 6/1929 | Cargle |
| 4,693,498 A | | 9/1987 | Baugh et al. |
| 5,215,336 A | * | 6/1993 | Worthing .............. F16L 19/005 285/319 |
| 5,785,357 A | * | 7/1998 | Foster ................... E21B 17/043 285/322 |
| 6,824,170 B2 | * | 11/2004 | Lee ..................... F16L 19/0231 285/314 |
| 8,555,765 B2 | * | 10/2013 | Graham, II ........... F41A 21/325 285/92 |
| 9,279,526 B2 | * | 3/2016 | McAlister ............. F16L 19/005 |
| 9,708,865 B2 | * | 7/2017 | Steen .................... F21B 17/043 |
| 2014/0167408 A1 | * | 6/2014 | Steen .................... E21B 17/043 285/330 |
| 2016/0076316 A1 | * | 3/2016 | Gallagher ............... F16L 15/08 166/242.6 |

FOREIGN PATENT DOCUMENTS

| | | |
|---|---|---|
| WO | WO2014/058967 | 4/2014 |
| WO | WO2014/093025 | 6/2014 |
| WO | WO2016/205267 | 12/2016 |

OTHER PUBLICATIONS

Singapore Office Action; dated Aug. 29, 2016 (2 pages).
Intellectual Property Office of Singapore, IPOS—11201508628V, Search Report and Written Opinion, dated Jul. 15, 2016 (8 pages).
Intellectual Property Office—GB1307910.8, dated Oct. 11, 2013 (1 page).

* cited by examiner

ANTI-ROTATION DEVICE FOR PIPE STRING

TECHNICAL FIELD

The present invention relates to anti-rotation devices for pipe string couplings used in the oil industry and more particularly to pipe strings which incorporate such anti-rotation devices.

BACKGROUND

During oil exploration and extraction, long tubular members, known as pipe strings, are run from a drilling rig into the ground through bore holes so as to extend underground ultimately to an underground oil reservoir. These pipe strings are not continuous, but instead are formed of separate lengths which are connected together. This is not only because of the distances involved making a continuous length of pipe impractical, but also because different operating tools are normally connected within the pipe string to suit requirements—for example if a branch bore needs to be drilled or the like. Each pipe string element is therefore usually formed with a male connector on one end and a matching female connector on the other end (typically a male and female thread), so that the next pipe string element is connected to the end of the previous one by simply inserting one end into the other and then rotating to connect them together.

In practice, however, it is found that, during use, adjacent pipe string elements can rotate relative to each other. For example, for off-shore operations, the pipe string will extend from the drilling rig to the sea bed through the sea and the wave action and vibration in the pipe string resulting therefrom can cause the connected male and female connectors to rotate relative to each other. A relatively small amount of rotation can, then, cause the whole connection to fail.

It is therefore the practice in the art to impose some sort of rotation lock on the connection between pipe string elements which prevents relative rotation between the connected male and female connectors, thereby preventing unintentional release of the joint. For example, one known approach is to deform the joint once the connection is made so that the concentric male and female parts are deformed into an eccentric shape and hence are prevented from relative rotation. Another approach is to form radially extending apertures in the walls of the male and female members which align with each other when the connector is fully made, a pin, screw or the like then being inserted through both holes to prevent rotation between the two connector parts. Other solutions are also known. However, none give a satisfactory solution for a variety of reasons. For example, deforming (crimping) requires additional tools to be used during the connection process, extending the time associated with completing the operation and also taking up valuable space on the rig. Use of locking screws/pins requires very precise manufacturing in order to ensure that the radial apertures are properly aligned when the connection is fully made, thereby increasing cost.

According to the present invention there is provided a tubular pipe string element having: a first end with a male connector formed thereon, a second end having a female connector formed thereon which is complementary to the male connector, said male and female connectors being of the rotational connector type such that, in use, the male connector is engageable in a female connector of another pipe string element and rotatable relative thereto in a first direction in order to secure the connection and in a second direction in order to release the connection, and complementary anti-rotation devices associated with said male and female connectors which anti-rotation devices cooperate to prevent unintentional relative rotation between male and female connectors in the second direction; wherein said anti-rotation devices comprises: at least one saw-tooth profiled, radially extending tooth having a shallow leading tooth flank angle facing in one of said first and second direction and a steep trailing tooth flank angle facing in the other of said first and second directions formed on the pipe string element proximate one end thereof in association with one of the male and female connectors, and at least one detent member formed on the pipe string element proximate the other end thereof in association with the other of the male and female connectors, said at least one saw-tooth profiled tooth and said at least one detent member being rotationally and axially fast, with the pipe string element wherein, in use upon relative rotation in the first direction between engaged male and female connectors, the leading flank of the at least one saw-tooth profiled tooth engages with the at least one detent member, urging it to retract against a biasing member and allowing the connectors to rotate into a fully connected position, the steep trailing tooth flank being trapped by the detent member when in the fully connected position so as to prevent unintentional release of the connection.

A pipe string element in accordance with the invention has the advantage that the anti-rotation elements operate to prevent unintentional disconnection of the male and female connectors without requiring any additional tooling during the making up of the tool string and also without causing any permanent damage or deformation to either of the pipe string components, making the components more easily reused.

Preferably, each detent member comprises a cantilever spring arm provided on the relevant surface of the male or female connector with a locking member thereon which is urged by the spring force of the spring arm into the rotational path of the saw-tooth profiled tooth but which is retractable out of said path against the spring force upon engagement with the leading flank of the at least one tooth. In a particularly preferred embodiment, a through opening is formed in the wall of the tubular member in which the locking member engages. This can be achieved particularly effectively by forming the spring arm integrally with the pipe string element by cut outs in the wall of the pipe string element. This has the advantage that the locking member and/or spring arm is accessible from the side of the pipe string element remote from the mating connectors, thereby facilitating manual retraction of the locking member in order to release the connectors.

The male and female connectors are preferably threaded connectors but other types of rotational connector are also possible such as bayonet connectors.

The anti-rotation elements are preferably located proximate a tip end of the female connector and proximate the root end of the male connector. In the preferred embodiment, the at least one tooth is provided on the outer surface of the male connector and the at least one locking member and associated spring arm is provided in the tubular wall of the female connector. In this way, the manual release of the locking member can be achieved from outside of the pipe string element using a specially designed release tool.

Preferably, a plurality of spring arms and associated locking members are provided, which may be equi-angularly distributed around the pipe string element but may also be distributed otherwise there-around, with a corresponding plurality of teeth also being provided. The teeth may then be provided around the entire periphery of the string element or may be provided in distinct groups, the groups being distributed around the pipe string element to match the distribution of the locking members.

In a particularly preferred embodiment, the trailing edge of each saw-tooth profiled tooth is inclined backwards to form an undercut, and the trailing face of the locking member which engages against the trailing flank to prevent release is similarly undercut in a complementary manner so that the surfaces hook into each other to provide a particularly secure block against unintentional release.

BRIEF DESCRIPTION OF THE FIGURES

In order that the invention may be well understood, there will now be described embodiments thereof, given by way of example, reference being made to the accompanying drawings, in which.

DETAILED DESCRIPTION

Figure 1:
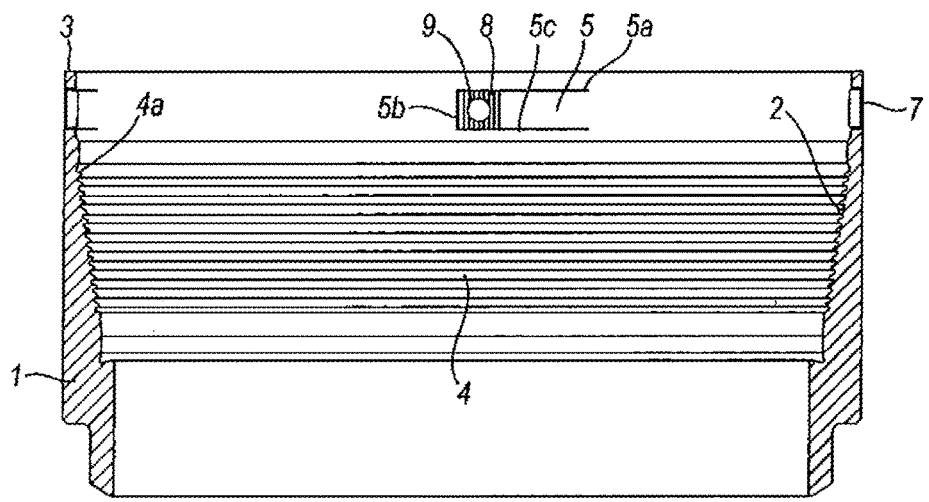
FIG. 1 is a sectional view through a box connector end of a pipe string element according to the invention.
Figure 2:
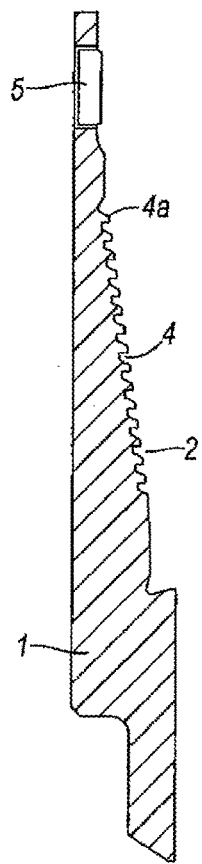
FIG. 2 is a sectional view on a second plane through the box connector of FIG. 1.

Referring first to FIG. 1, there is shown a section through a box connector 1, being the female part of a threaded connector carried on one end of a pipe string element according to the invention. The box connector 1 is tubular and has an internal, inwardly tapering inner surface 2 extending away from an open end 3 on which is formed a female thread 4 into which is screwingly engageable a complementary male thread carried on the mating end of another pipe spring element.

Figure 3:
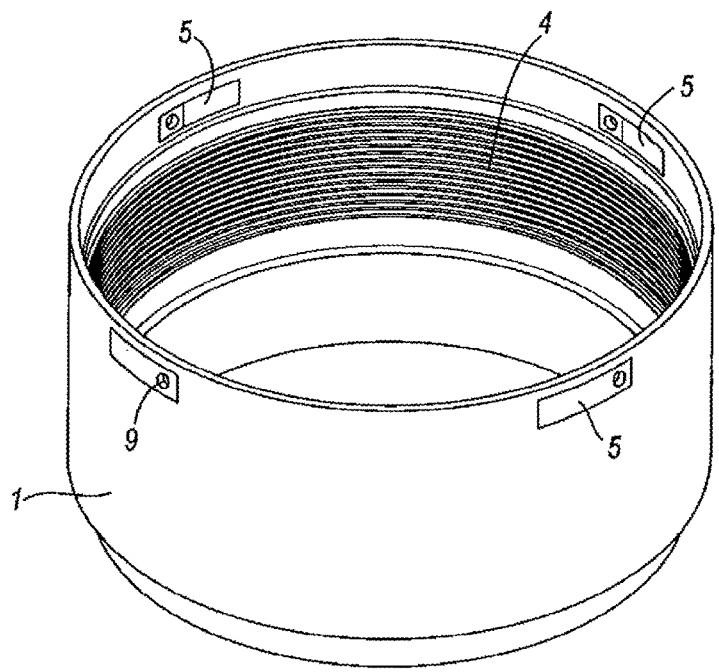
FIG. 3 is a perspective view of the box connector of FIG. 1.
Figure 4:
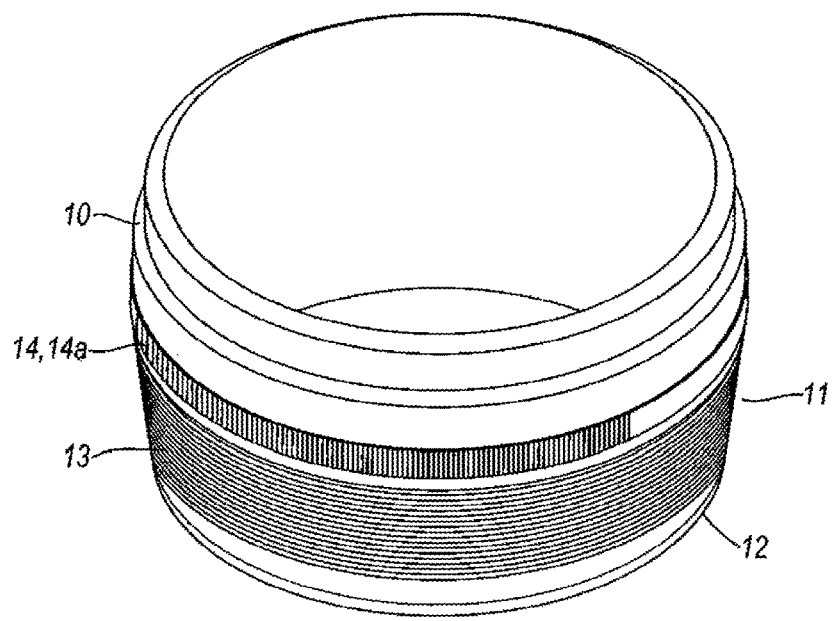
FIG. 4 is a perspective view of a pin connector end of a pipe string element according to the invention.

Between the outer end 4a of the thread 4 and the open end 3 of the box connector 1 four ligaments 5 are formed in the tubular wall 6 of the box connector 1. The four ligaments are equi-angularly distributed about the circumference of the box connector 1 as shown more clearly in FIG. 3, but other distributions are also permissible within the scope of the invention. Each ligament 5 is formed by three through cuts 5a, 5b, 5c in the wall of the box connector 1 which bound three sides of the ligament 5. The ligaments are thereby both rotationally and axially fast with the box connector 1, so as to be constrained against axial or rotational movement relative to the box connector 1.

Figure 7:
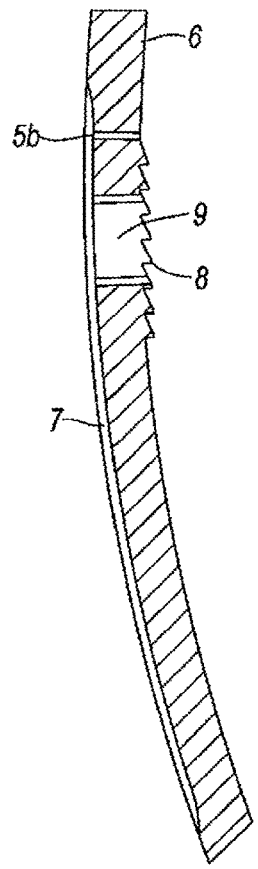
FIG. 7 is an enlarged view of an anti-rotation ligament which is formed as part of the box connector.

The stiffness of the metal of the ligament 5 biases the ligament into a position in which it lies substantially in line with the wall 6 of the box connector 1 as shown in FIG. 7. A cut-out 7 in the outer surface of each ligament 5 reduces the thickness of the ligament and makes it more resiliently deformable so as to allow the ligaments to deflect outwards as described below.

Figure 8:
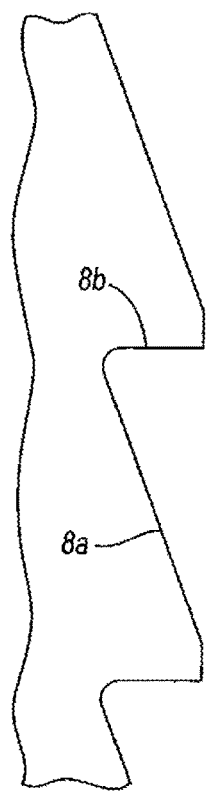
FIG. 8 is an enlarged view showing the profile of one of the teeth carried on the locking member formed on the end of the ligament.
Figure 9:
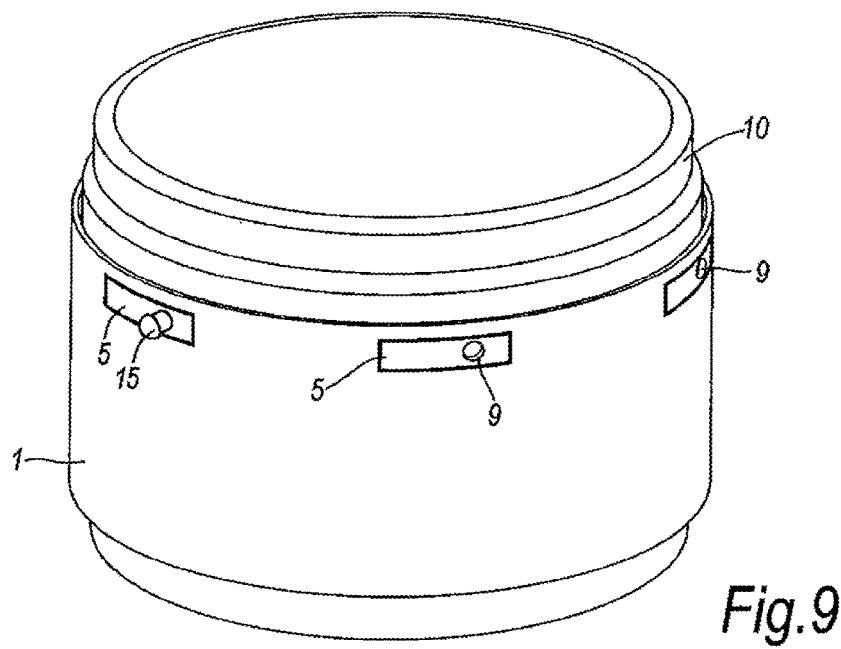
FIG. 9 is a perspective view of the box and pin connectors connected together.
Figure 10:
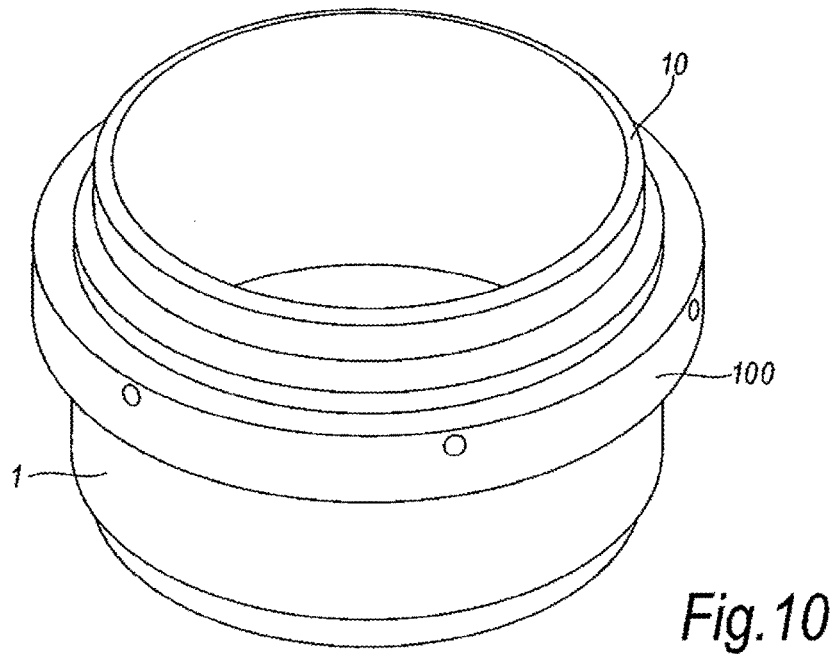
FIG. 10 is a perspective view of the assembled connectors with a release collar mounted on the box connector.

As shown in FIG. 7, a number of saw-tooth profiled teeth 8 are formed on the inner surface of the end of the ligament 5, which teeth 8 project inwardly of the inner wall of the box connector and are oriented in the circumferential direction. The term "saw-tooth profiled" is used to describe teeth which have a shallower inclined leading flank 8a and a steeply inclined trailing flank 8b, as shown in more detail in FIG. 8. During operation as described below, the shallow incline of the leading flank 8a enables a camming action to be developed through interaction with teeth on a pin member so as to cause the ligaments to deflect outwards and hence allow the teeth of the pin member to rotate past the teeth of the ligaments, whereas the steep trailing flank lockingly engages with the teeth of the pin member when rotated in the opposite direction and prevents such rotation. As shown in FIG. 8, the trailing flank 8b of the teeth 8 of the ligaments 5 have an undercut of approximately 2 degrees.

A radially extending threaded hole 9 is also formed near the free end of each ligament 5 for screwing in a tool for manually retracting the ligaments to enable manual release of the connection as described below.

Figure 5:
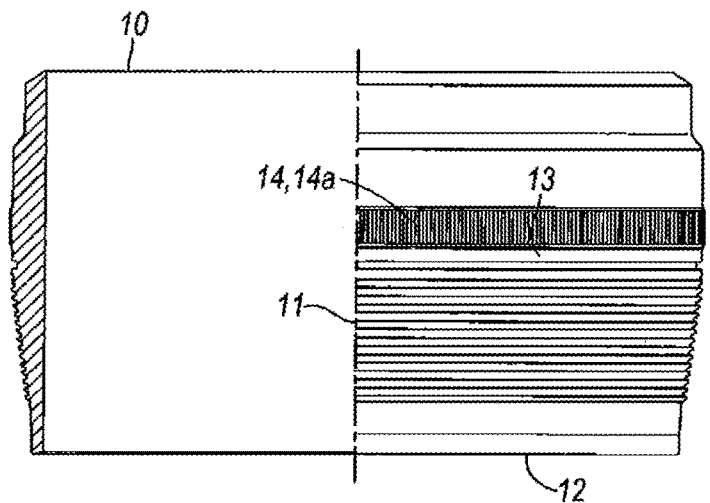
FIG. 5 is a sectional view on a first plane through the pin connector of FIG. 4.

FIG. 5 is a section through a pin connector 10 which complements the box connector 1 described above and which is formed on the other end of pipe string element of the invention so as to enable multiple such elements to be connected end to end. The pin connector 10 has a frusto-conical outer surface 11 which tapers inwardly towards the end 12 of the connector and has a male thread 13 formed thereon which complements the female thread 4 formed on the inner surface of the box connector such that the pin connector 10 may be screwed into the box connector 1 to couple neighbouring pipe string elements together.

Figure 6:
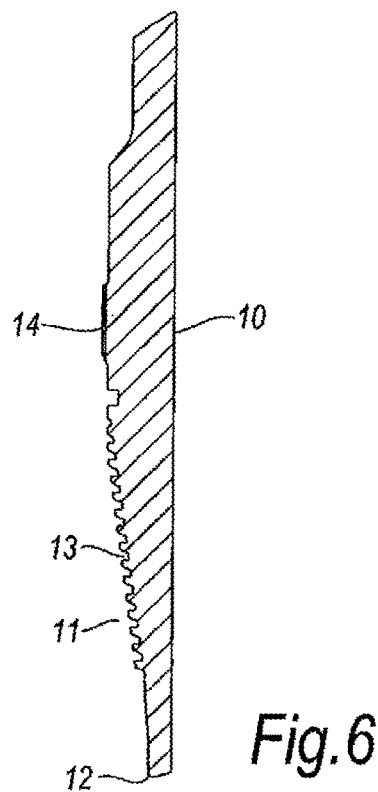
FIG. 6 is a sectional view on a second plane through the pin connector of FIG. 4.

A series of circumferentially extending saw-tooth profiled teeth 14 are formed on the other surface of the pin connector 10 proximate the end of the thread 13 remote from the end 12 of the connector 10 as shown in FIG. 6. The teeth 14 may extend around the entire periphery of the pin connector 10, as shown in the illustrated embodiment. The teeth may alternatively be arranged into groups of teeth 14a, the groups 14a being distributed around the periphery of the pin connector 10 in positions which correspond with the positions of the ligaments 5 on the box member so that, when the pin member 10 is fully screwed into the box member, each group of teeth 14 on the pin member aligns with and engages the teeth 8 on one of the ligaments. The teeth 14 are formed directly on or fastened directly to the pin connector 10 so as to be constrained against both axial and rotational movement relative to the pin connector 10.

The teeth 14 on the pin connector are sized so that they project beyond the outer periphery of the pin connector and are a clearance fit with the inner periphery of the box member 1 so that the pin member 10 can easily be engaged into the box member 1 and rotated in a first direction in order to screw the threads 4, 13 together.

As the pin connector 10 approaches its fully engaged position, the teeth 14 on the pin connector come into alignment with the teeth 8 on the ligaments, the teeth 8 on the ligaments projecting inwardly of the inner surface of the box connector 1 so that they are engaged by the teeth 14 on the pin connector 10, the shallow inclined flanks of the two sets of teeth 8, 14 contacting each other. The resulting camming action imparts a radially outward force on the ligaments 5, causing them to move radially outwards against the biasing force of the canti-lever arms of the ligaments and hence allowing the two sets of teeth 8, 14 to ratchet over each other as the connectors 1, 10 rotate to their fully engaged position.

The teeth 14 or groups of teeth 14*a* on the pin connector 10 are positioned to ensure that, in the fully engaged position, at least some of the teeth thereof are overlapped with the teeth 8 of the ligaments 5. If the connectors 1, 10 are then rotated in the opposite/release direction relative to each other, the steep flanks 8*b* of the teeth 8, 14 abut against each other and the under-cuts thereof hook the teeth together, preventing relative radial movement therebetween and blocking further rotation of the connectors in the release direction.

In order to release the connectors, a manual release tool 100, 200 is used in conjunction with threaded pegs 15 which are screwed into the holes 9 formed in the ligaments 5 from the outer surface of the box connector 1 so that heads of the pegs 15 sit proud of the outer surface of the box connector 1. The release tool 100 takes the form of a sleeve 100 which is engageable over the outside of the box connector 1 and has axially extending ramped slots formed on its inner surface. As the release tool 100 is slid onto the box connector 1, the head of each peg 15 is engaged into one of the ramped slots, the ramping of the slots developing a camming action which pulls the peg 15 radially outwards as the tool 100 is slid further forward, which, in turn, pulls the ligament 5 radially outwards against the biasing loading of the spring arm. The teeth 8 on the ligaments 5 are thereby disengaged from the teeth 14 on the pin member, freeing the two connectors 1, 10 to be rotated relative to each other in the second direction in order to release the connection. It will, of course, be understood that the release tool 200 may be configured for rotational rather than axial operation by orienting the ramped slots to extend circumferentially rather than axially.

It will be understood that whilst the invention has been description in connection with a screw coupling, other forms of rotation coupling may also be used, such as a bayonet-type coupling. Also, whilst it is preferable to have saw-tooth profiled teeth on both connectors, the invention may also be achieved with teeth on just one of the connectors which engage with a simple block or the like.

The exact position of the ligaments and mating teeth on the pin connector are also not essential to the invention. Whilst it is advantageous to locate the ligaments proximate the open end of the box member 1 since the thickness of the wall here is lower and hence the loading afforded by the ligaments easier to set and adjust, they may also be located within the threads or at the end of the threads remote from the open end, as long as the teeth 8, 14 on the two connectors 1, 10 are positions relative to each other to ensure engagement when the connectors are fully screwed together.

Figure 11:
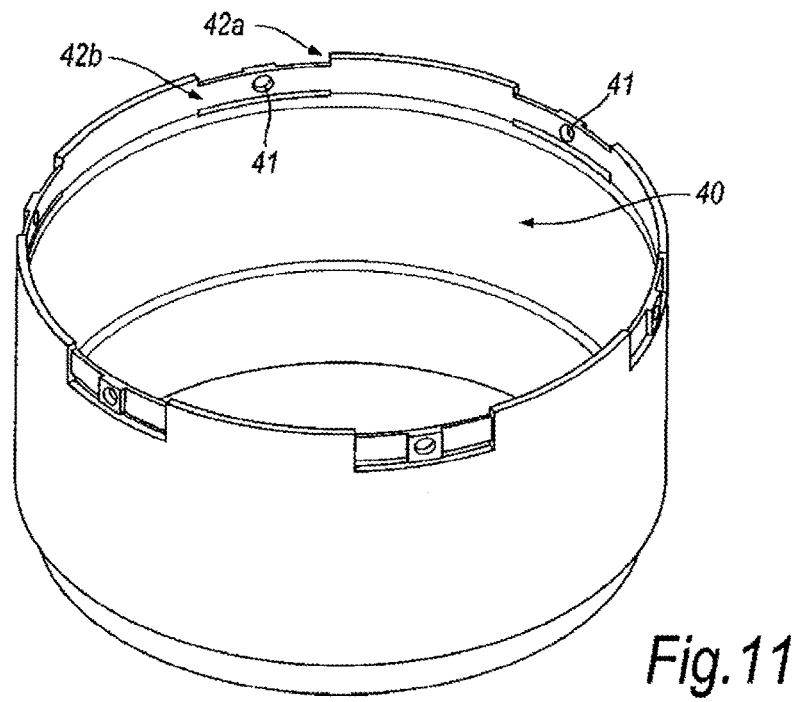
FIG. 11 is a perspective view of a box connector of a pipe string element according to a second embodiment of the invention.
Figure 12:
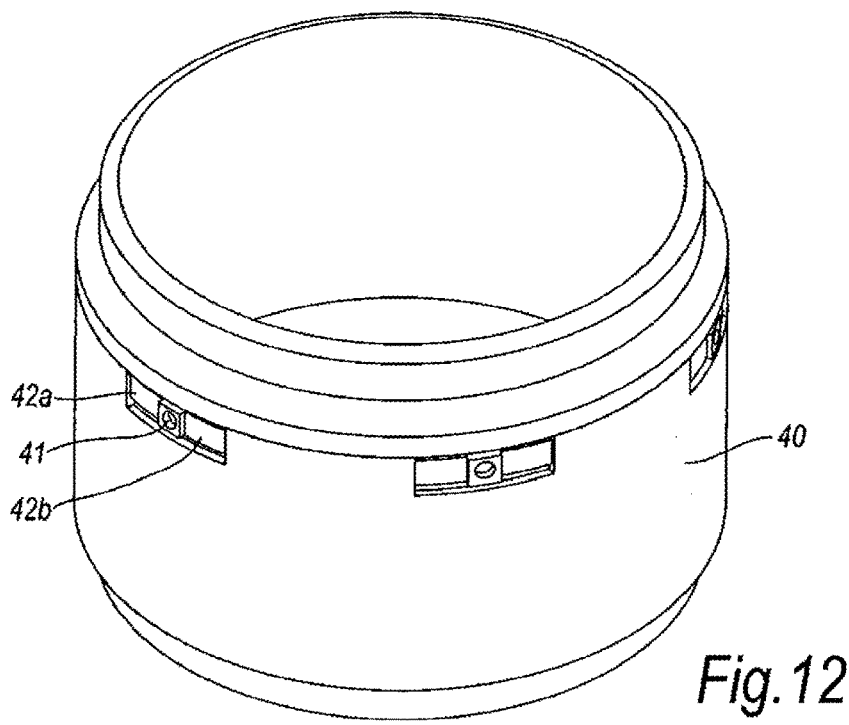
FIG. 12 is a perspective view of the box connector of FIG. 11 screwed together with the pin connector of FIG. 5.
Figure 13:
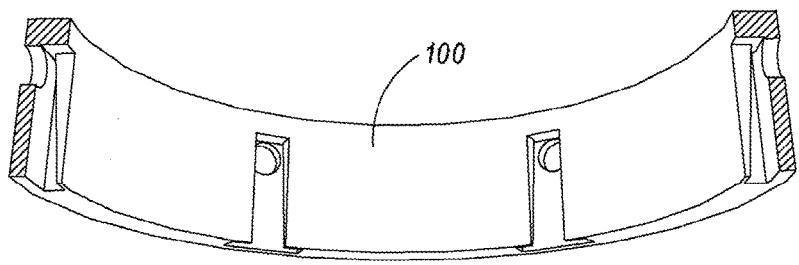
FIG. 13 is a perspective view of a first example of a release tool according to the invention.
Figure 14:
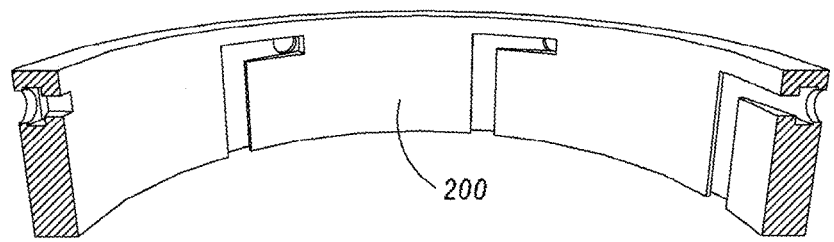
FIG. 14 is a perspective view of a second example of a release tool according to the invention.

Referring now to FIG. 11, there is shown a second embodiment of a box connector 40 of the invention. This is identical with the box connector according to the first embodiment except that instead of the teeth of the box connector 40 being carried on cantilevered ligaments, each set of teeth 41 is supported by a pair of ligaments 42*a*, 42*b*, the two ligaments 42*a*, 42*b* in each case deflecting outwards together to allow the teeth 41, 14 of the pin and box connectors 10, 40 to ratchet over each other. It will also be seen that in this embodiment, 6 detents are provided equi-angularly distributed around the box connector as compared with 4 on the first embodiment. It will be understood from this that the exact number is not important, although it is preferable that they be evenly distributed around the box member to help balance loading.

What is claimed is:

1. A tubular pipe string element having:
    a first end with a male connector formed thereon,
    a second end having a female connector formed thereon which is complementary to the male connector, said male and female connectors being of the rotational connector type such that, in use, the male connector is engageable in a female connector of another pipe string element and rotatable relative thereto in a first direction in order to secure the connection and in a second direction in order to release the connection, and
    complementary anti-rotation devices associated with said male and female connectors wherein the anti-rotation devices cooperate to prevent unintentional relative rotation between the male and female connectors in the second direction; wherein said anti-rotation devices comprise:
        at least one saw-tooth profiled, radially extending tooth having a shallow leading tooth flank angle facing in one of said first and second direction and a steep trailing tooth flank angle facing in the other of said first and second directions formed on the pipe string element proximate one end thereof in association with one of the male and female connectors, and
        at least one detent member formed on the pipe string element proximate the other end thereof in association with the other of the male and female connectors, said at least one saw-tooth profiled tooth and said at least one detent member being rotationally and axially fast, with the pipe string element wherein, in use upon relative rotation in the first direction between engaged male and female connectors, the leading flank of the at least one saw-tooth profiled tooth engages with the at least one detent member, urging it to retract against a biasing member and allowing the connectors to rotate into a fully connected position, the steep trailing tooth flank being trapped by the at least one detent member when in the fully connected position so as to prevent unintentional release of the connection, wherein the or each detent member is supported by a spring arm, wherein the or each spring arm is integrally formed with the pipe string element in association with the other of the male and female connectors by cut outs in a tubular wall of the pipe string element, and
        wherein the or each spring arm extends circumferentially around the other of the male and female connectors from at least one end that is integral with the pipe string element.

2. A tubular pipe string element according to claim 1, wherein each of the at least one detent member comprises at least one locking member supported on said other of the male and female connectors by at least one spring arm which urges the at least one locking member into a position in which it protrudes from a surface of said other of the male and female connectors so as to lie in the rotational path of the at least one saw-tooth profiled tooth, said locking member being retractable out of said path against the spring force upon engagement with the leading flank of the at least one tooth.

3. A tubular pipe string element according to claim 2, wherein a through opening is formed in the tubular wall of said other of the male and female connectors in which the locking member engages.

4. A tubular pipe string element according to claim 2, wherein each of the at least one detent member is supported by a single cantilever spring arm.

5. A tubular pipe string element according to claim 2, wherein each of the at least one detent member is supported between the ends of a pair of spring arms.

6. A tubular pipe string element according to claim 1, wherein the at least one detent member comprises a plurality of detent members, wherein the plurality of detent members are provided on said other of the male and female connectors equi-angularly distributed about the circumference thereof.

7. A tubular pipe string element according claim 1, wherein each of the at least one detent member includes at least one saw-tooth profiled tooth having a shallow leading edge and a steep trailing edge, said at least one tooth being oriented to engage, in use, the leading edge of a tooth associated with the one end of a mating pipe string element.

8. A tubular pipe string element according to claim 1, wherein the at least one saw-tooth profiled tooth comprises a plurality of saw-tooth profiled teeth, wherein the plurality of saw-tooth profiled teeth are provided on the one end of the pipe string element in association with said one of the male and female connectors extending circumferentially around the surface thereof.

9. A tubular pipe string element according to claim 8, wherein said plurality of teeth extend continuously around the entire circumference of the pipe string element.

10. A tubular pipe string element according to claim 8, wherein said plurality of teeth are arranged into a plurality of separate groups corresponding in number to the number of detent members located proximate said other end, said groups of teeth being equiangularly distributed around the circumference of the pipe string element.

11. A tubular pipe string element according to claim 1, wherein the male and female connectors are threaded connectors.

12. A tubular pipe string element according to claim 1, wherein the anti-rotation devices are located proximate a tip end of the female connector and proximate the root end of the male connector.

13. A tubular pipe string element according to claim 1, wherein the at least one saw-tooth profiled tooth is provided on the outer surface of the male connector and the at least one detent member is provided in the tubular wall of the female connector.

14. A tubular pipe string element according to claim 1, wherein the trailing edge of each saw-tooth profiled tooth is inclined backwards to form an undercut.

15. A tubular pipe string element according to claim 1, wherein each of the at least one detent member includes an opening therein to enable each of the at least one detent member to be manually retracted against the loading of the biasing member.

16. A tubular pipe string element according to claim 15, wherein the opening is a threaded opening in which is engageable a threaded stud so as to enable the at least one detent to be retracted by pulling on the head of the threaded stud.

17. A tubular pipe string element according to claim 1, wherein the at least one detent member is adapted to deflect radially outwards when the leading flank of the at least one saw-tooth profiled tooth engages with said detent member.

18. A release tool for releasing a connection between adjacent ends of a pair of tubular pipe string elements, the release tool comprising a collar having at least one ramped slot provided on an inner surface thereof in which, in use, is engageable with a head of a peg which is engaged in an opening in at least one detent member of a tubular pipe string element.

19. A release tool according to claim 18, wherein each slot extends axially along the collar.

20. A release tool according to claim 18, where each slot extends circumferentially around the inner surface of the collar.

* * * * *